US008354158B2

(12) United States Patent
Xie et al.

(10) Patent No.: US 8,354,158 B2
(45) Date of Patent: Jan. 15, 2013

(54) MICROFIBROUS ARTICLE AND METHOD OF FORMING SAME

(75) Inventors: Tao Xie, Troy, MI (US); Hamid G. Kia, Bloomfield Hills, MI (US); Man Zhang, Rochester Hills, MI (US); John C. Ulicny, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/873,592

(22) Filed: Sep. 1, 2010

(65) Prior Publication Data

US 2012/0052239 A1 Mar. 1, 2012

(51) Int. Cl.
*B32B 5/02* (2006.01)
*B32B 7/00* (2006.01)
*B05D 3/02* (2006.01)

(52) U.S. Cl. ....... 428/119; 428/98; 428/292.1; 428/553; 428/554; 428/661

(58) Field of Classification Search .................. 428/119, 428/98, 292.1, 553, 661, 544
See application file for complete search history.

(56) References Cited

U.S. PATENT DOCUMENTS 5,110,651 A * 5/1992 Massard et al. ............... 428/105

OTHER PUBLICATIONS

Tao Xie, Ingrid A. Rousseau, "Facile tailoring of thermal transition temperatures of epoxy shape memory polymers", Polymer, Feb. 2009, pp. 1852-1856, vol. 50, Elsevier Ltd.

Tao Xie, "Tunable polymer multi-shape memory effect", Nature, Mar. 11, 2010, pp. 267-270, vol. 464, Macmillian Publishers Limited.

* cited by examiner

*Primary Examiner* — Brent O'Hern
(74) *Attorney, Agent, or Firm* — Quinn Law Group, PLLC

(57) ABSTRACT

A microfibrous article includes a substrate and a plurality of magnetic fibers disposed on the substrate. Each of the plurality of magnetic fibers is individually sheathed with a polymer and includes a plurality of magnetic particles. Further, each of the plurality of magnetic fibers is aligned along a magnetic field and not connected by the polymer to any adjacent magnetic fiber. A method of forming the microfibrous article is also disclosed.

10 Claims, 4 Drawing Sheets

MICROFIBROUS ARTICLE AND METHOD OF FORMING SAME

TECHNICAL FIELD

The present disclosure generally relates to a microfibrous article and a method of forming the microfibrous article.

BACKGROUND

Many applications require functional surfaces configured to adhere, frictionally engage, and/or attach to other opposing surfaces. For example, biological tissue may adhere to a substrate, a brake pad may frictionally engage a locomotive wheel, and an automotive floor mat may attach to a vehicle floor. Frequently, such applications also require reversible adhesion and/or attachment between the functional surface and the opposing surface. For example, biological tissue may require separation from the substrate after grafting to a host, and automotive floor mats may occasionally be repositioned. Therefore, functional surfaces for such applications often require enhanced topography to optimize coupling between the functional surface and the opposing surface.

SUMMARY

A microfibrous article includes a substrate and a plurality of magnetic fibers disposed on the substrate. Each of the plurality of magnetic fibers is individually sheathed with a polymer and includes a plurality of magnetic particles. Further, each of the plurality of magnetic fibers is aligned along a magnetic field and is not connected by the polymer to any adjacent magnetic fiber.

A method of forming a microfibrous article includes disposing a plurality of magnetic particles on a substrate. After disposing, the method includes applying a magnetic field having a plurality of magnetic field lines arranged in a predetermined geometry to the substrate to thereby form a plurality of magnetic fibers on the substrate each aligned along the magnetic field. Concurrent with applying, the method also includes contacting the plurality of magnetic fibers with a polymer precursor to thereby individually sheathe each of the plurality of magnetic fibers with the polymer precursor. Also concurrent with applying and after contacting, the method includes solidifying the polymer precursor to thereby individually sheathe each of the plurality of magnetic fibers with a polymer so that each of the plurality of magnetic fibers is not connected by the polymer to any adjacent magnetic fiber to thereby form the microfibrous article.

In one variation, the method includes, concurrent with applying, contacting the plurality of magnetic fibers with an amount of the polymer precursor sufficient to thereby individually sheathe each of the plurality of magnetic fibers with the polymer precursor. Additionally, concurrent with applying and after contacting, the method includes sufficiently curing the polymer precursor so that each of the plurality of magnetic fibers is selectively permanently fixed by a sufficiently thin layer of the polymer and is not connected by the polymer to any adjacent magnetic fiber. Further, after curing, the method includes changing a shape of at least some of the plurality of magnetic fibers between a first configuration and a second configuration to thereby form the microfibrous article.

The method economically forms the microfibrous article, and is sufficiently flexible to accommodate desired characteristics of the microfibrous article. For example, the microfibrous article may be tailored to include magnetic fibers aligned substantially parallel to any predetermined direction. As such, the resulting microfibrous article exhibits excellent controllable adhesion to, and releaseability from, other opposing surfaces.

The above features and advantages and other features and advantages of the present disclosure are readily apparent from the following detailed description of the best modes for carrying out the disclosure when taken in connection with the accompanying drawings.

DETAILED DESCRIPTION

Figure 1:
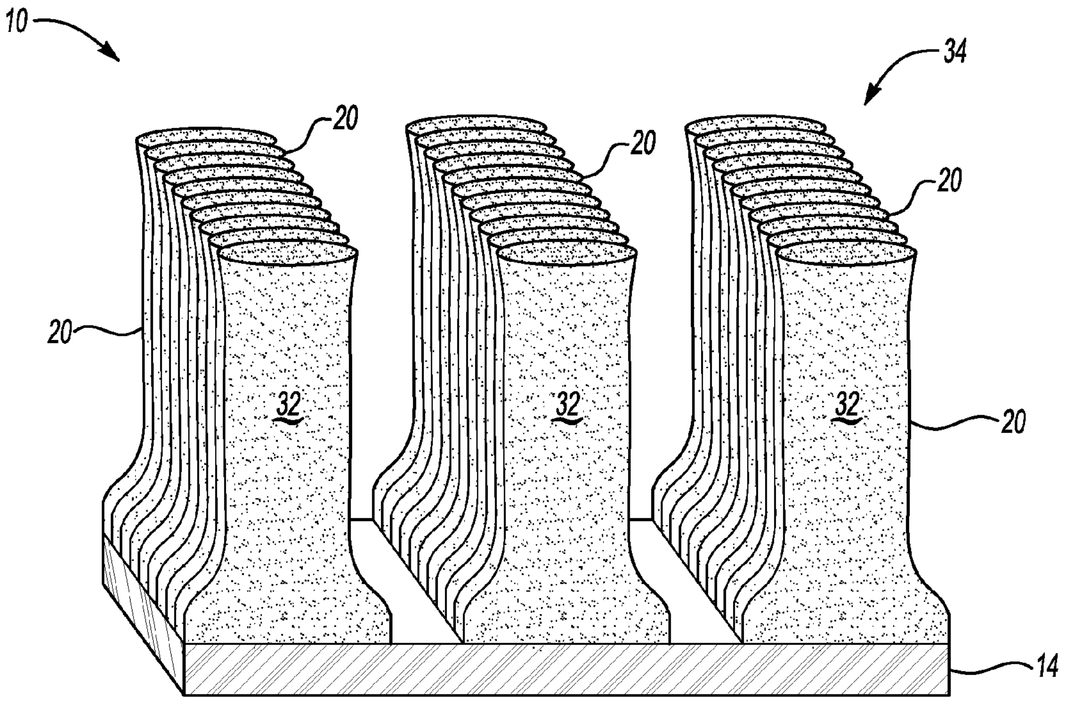
FIG. 1 is a schematic magnified perspective view of a microfibrous article including a plurality of magnetic fibers individually separated and disposed on a substrate.

Referring to the Figures, wherein like reference numerals refer to like elements, a microfibrous article is shown generally at 10 in FIG. 1. As set forth in more detail below, and by way of non-limiting examples, the microfibrous article 10 may be useful for applications requiring adhesion, frictional engagement, and/or attachment between opposing surfaces. For example, the microfibrous article 10 may be useful for automotive applications requiring attachable components. However, the microfibrous article 10 may also be useful for non-automotive applications, such as, but not limited to, deployable space structures, biomedical devices, adaptive optical devices, smart dry adhesives, fasteners, friction surfaces, tissue adhesives, wetting surfaces, furniture, toys, and other aviation, rail, construction, recreational, and biomedical applications.

Figure 2:
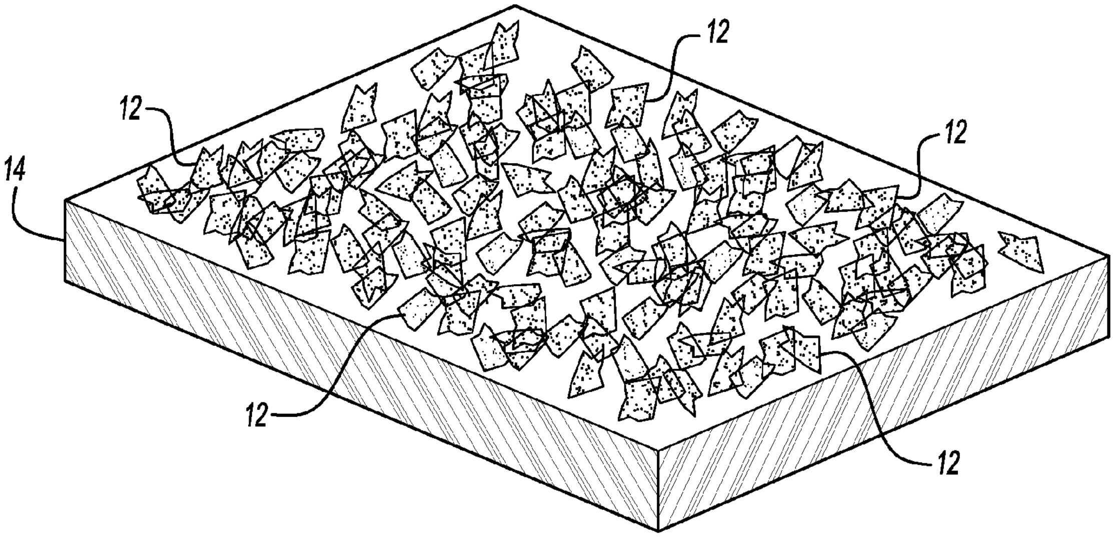
FIG. 2 is a schematic magnified perspective view of a portion of the substrate of FIG. 1, including a plurality of magnetic particles disposed thereon.
Figure 3:
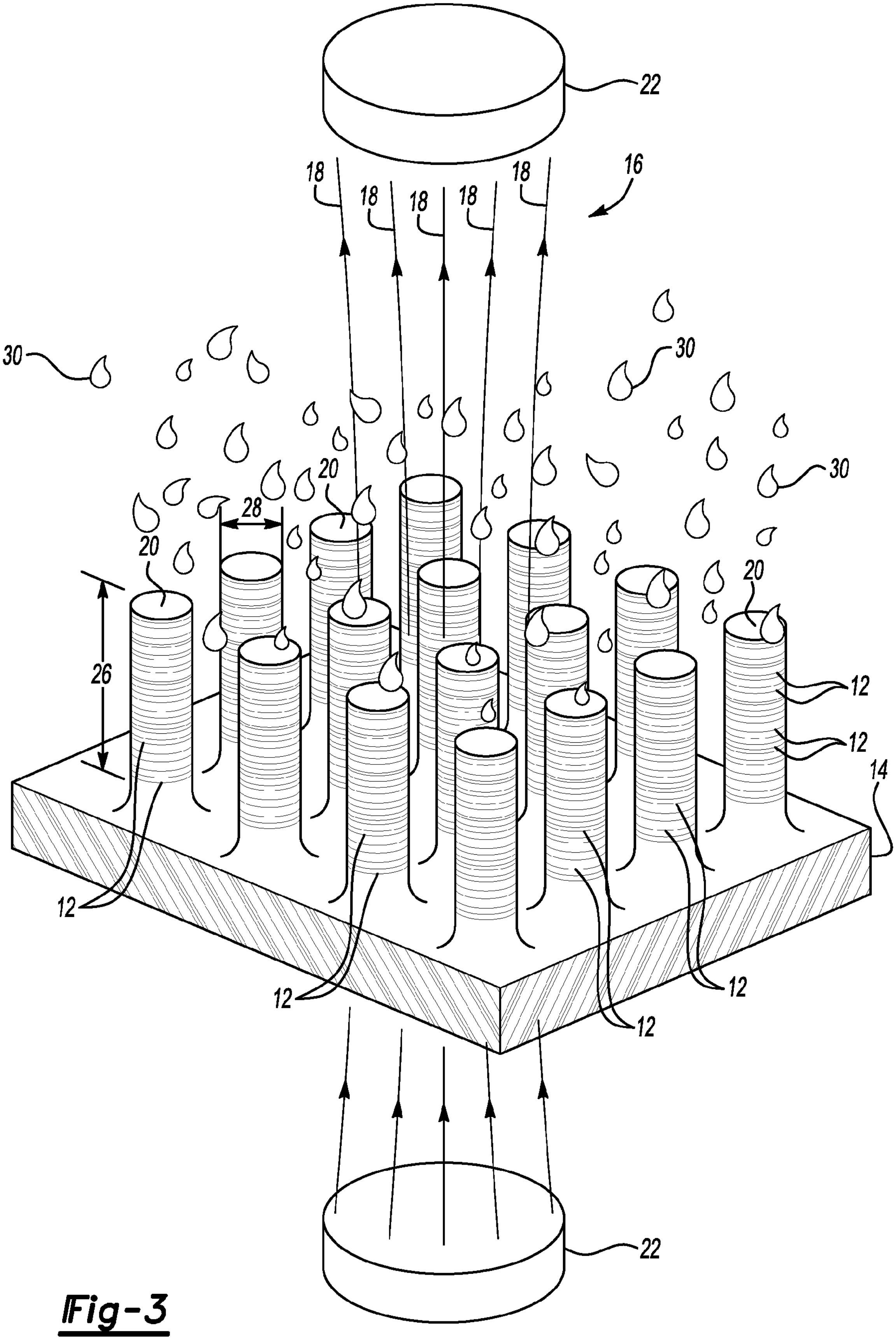
FIG. 3 is a schematic magnified perspective view of a magnetic field applied to the substrate and plurality of magnetic particles of FIG. 2 to thereby form the plurality of individual magnetic fibers of FIG. 1.

A method of forming the microfibrous article 10 is described herein with reference to FIGS. 1-3. As shown in FIG. 2, the method includes disposing a plurality of magnetic particles 12 on a substrate 14. The substrate 14 may be configured to generally provide structure to the microfibrous article 10 (FIG. 1). For example, the substrate 14 may serve as a backing or base plate of the microfibrous article 10 and may support the plurality of magnetic particles 12, as set forth in more detail below. The substrate 14 may be formed from any material suitable for a desired application of the microfibrous article 10. In particular, the substrate 14 may include any non-magnetic material, such as, but not limited to, plastic, ceramic, fiber, wood, and combinations thereof. For example, the substrate 14 may include plastic, such as, but not limited to, thermosetting polymers and thermoplastics. Specific suitable thermosetting polymers include, but are not limited to, melamines, epoxies, and polyimides. Specific suitable thermoplastics include, but are not limited to, polyethylene, polypropylene, polyvinyl chloride, and polyethylene terephthalate.

Although the substrate 14 is shown as a backing plate in FIGS. 1-3, the substrate 14 may have any desired shape. That is, the substrate 14 may have a size, shape, and/or configuration selected according to the desired application of the microfibrous article 10. For example, the substrate 14 may be in the form of a sheet. Further, the substrate 14 may be rigid or flexible depending upon the stiffness and/or strength required for the microfibrous article 10.

Referring again to FIG. 2, the plurality of magnetic particles 12 may be formed from suitable magnetic metals having high magnetic permeability. For example, the plurality of magnetic particles 12 may be selected from the group including iron, nickel, cobalt, rare earth metals, and oxides, alloys, and combinations thereof.

Although shown as having an irregular shape for purposes of illustration in FIG. 2, each of the plurality of magnetic particles 12 may have any shape. For example, the plurality of magnetic particles 12 may be flakes, shards, filings, shavings, powders, discs, spheres, agglomerates, and combinations thereof. Generally, the plurality of magnetic particles 12 may have an elongated shape and/or may be in powder form. More specifically, each of the plurality of magnetic particles 12 may have an average particle size of from about 1 μm to about 200 μm, e.g., from about 1 μm to about 20 μm. In one variation, each of the plurality of magnetic particles 12 has an average particle size of from about 1 μm to about 10 μm.

For the method, the plurality of magnetic particles 12 may initially be disposed randomly on the substrate 14, as shown in FIG. 2. For example, the magnetic particles 12 may be poured or funneled onto the substrate 14 and may form agglomerations or layers. However, any suitable process for disposing or placing the magnetic particles 12 on the substrate 14 may be employed for the method.

Referring now to FIG. 3, after disposing the magnetic particles 12 on the substrate 14, the method includes applying a magnetic field (represented generally by 16 in FIG. 3) having a plurality of magnetic field lines 18 arranged in a predetermined geometry to the substrate 14 to thereby form a plurality of magnetic fibers 20 on the substrate 14. That is, applying the magnetic field 16 forms a plurality of individual magnetic fibers 20, wherein each of the plurality of individual magnetic fibers 20 is aligned along the magnetic field 16, as shown in FIG. 3. The magnetic field 16 may be applied via any suitable process and/or device. For example, applying the magnetic field 16 may include disposing the substrate 14 between two magnets 22, as shown in FIG. 3. However, the magnetic field 16 may also be applied by surrounding the substrate 14 and plurality of magnetic particles 12 with a conductor (not shown), such as a coil of wire, carrying an electric current which generates the magnetic field 16. Alternatively, the magnetic field 16 may be applied by any other suitable device, e.g., a single magnet 22.

Further, the magnetic field 16 may have any geometry or shape. For example, although the magnetic field lines 18 are shown schematically as having a generally parallel configuration in FIG. 3, the plurality of magnetic field lines 18 may converge or diverge, may wrap around the conductor (not shown) carrying the electric current, and/or may have a generally arced shaped. Further, the shape of the magnetic field 16 may be selected prior to applying the magnetic field 16 to the substrate 14 and plurality of magnetic particles 12. That is, the geometry of the arrangement of the plurality of magnetic field lines 18 may be predetermined, i.e., selected or chosen, by, for example, modifying a configuration of the magnets 22 (FIG. 3). Stated differently, the geometry of the magnetic field 16 applied to the substrate 14 may be predetermined according to a desired alignment of the plurality of magnetic fibers 20.

For example, as shown in FIG. 3, the magnetic field 16 may be applied in a direction substantially perpendicular to the substrate 14, e.g., via two magnets 22. That is, applying the magnetic field 16 may include aligning the plurality of magnetic field lines 18 substantially perpendicular to the substrate 14. Alternatively, referring to FIG. 4, applying the magnetic field 16 may include aligning the plurality of magnetic field lines 18 so as to define an acute angle 24 between the plurality of magnetic field lines 18 and the substrate 14.

In yet another variation, although not shown, the magnetic field 16 may be applied via a single magnet 22. It is to be appreciated that the magnetic field 16 applied via two magnets 22 includes substantially parallel magnetic field lines 18 across the entire magnetic field 16. In contrast, the magnetic field 16 applied via a single magnet 22 includes magnetic field lines 18 that may diverge from one another, i.e., fan apart, across the magnetic field 16.

Figure 4:
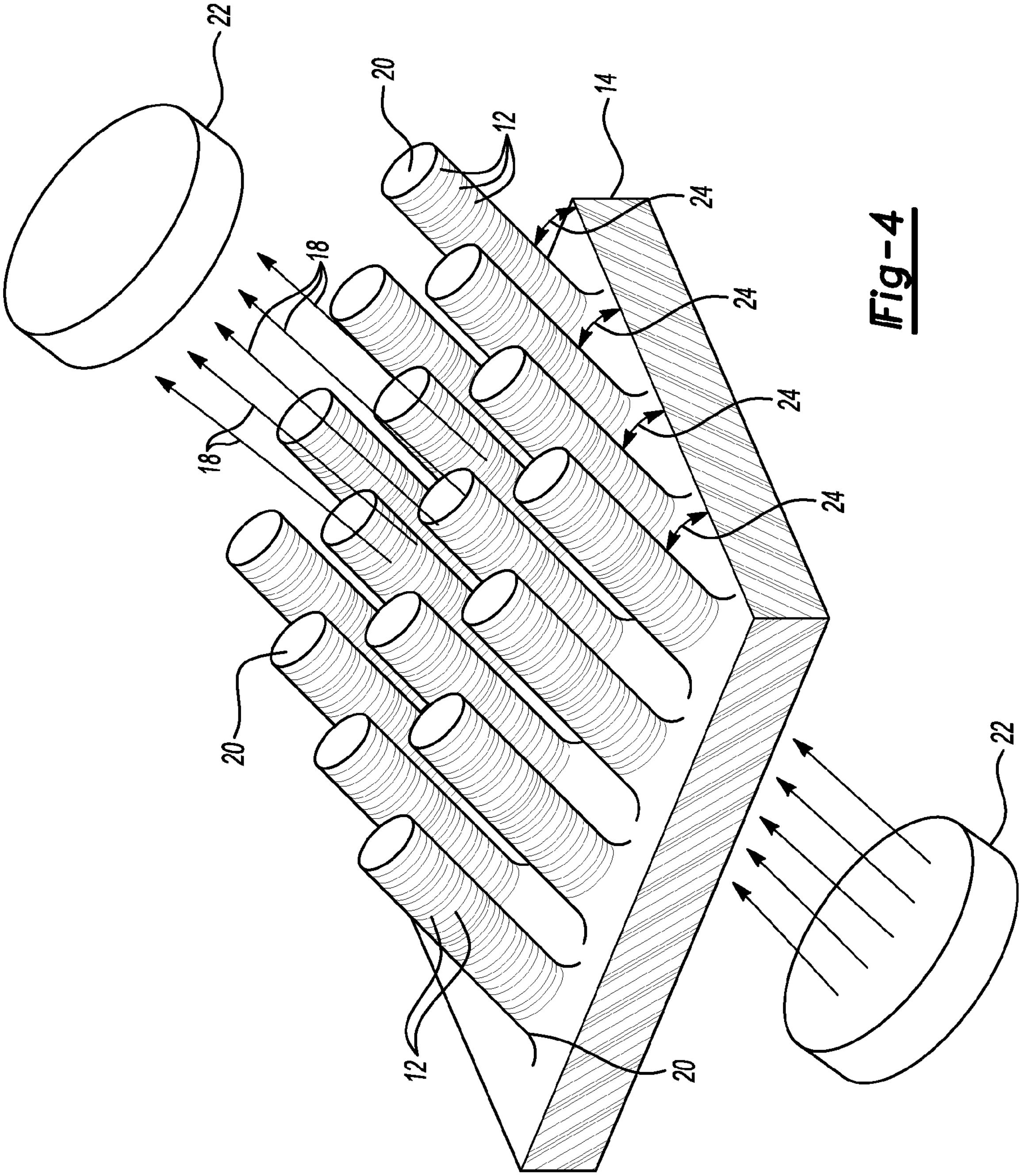
FIG. 4 is a schematic magnified perspective view of the microfibrous article of FIG. 1 wherein the substrate and each of the plurality of magnetic fibers define an acute angle therebetween.

Referring again to FIG. 3, the plurality of magnetic fibers 20 is aligned along the magnetic field 16. That is, the applied magnetic field 16 aligns and stacks the plurality of magnetic particles 12 (FIGS. 2 and 3) along the magnetic field lines 18 and thereby forms the plurality of magnetic fibers 20 disposed on the substrate 14. As shown in FIGS. 1 and 3, each of the plurality of magnetic fibers 20 may be disposed substantially perpendicular to the substrate 14. That is, the plurality of magnetic fibers 20 may project from the substrate 14 at a substantially right angle. Alternatively, as shown in FIG. 4, the substrate 14 and each of the plurality of magnetic fibers 20 may define the acute angle 24 therebetween. That is, the plurality of magnetic fibers 20 may project from the substrate 14 in a tilted or angled configuration. Further, although not shown, for applications requiring magnetic fibers 20 that are not parallel to one another, each of the plurality of magnetic fibers 20 may project from the substrate 14 in a fan-like configuration, e.g., along the magnetic field lines 18 of the magnetic field 16 of a single magnet 22.

Although each of the plurality of magnetic fibers 20 is shown as having a width of one magnetic particle 12 for illustration purposes in FIGS. 3 and 4, it is to be appreciated that each magnetic fiber 20 may have a width of more than one magnetic particle 12. For example, multiple magnetic particles 12 in the form of flakes may stack adjacent to one another and/or be in contact with one another along the length 26 (FIG. 3) and/or thickness 28 (FIG. 3) of the magnetic fiber 20 to thereby form one magnetic fiber 20. The plurality of magnetic fibers 20 may be micro-fibrillar, i.e., each magnetic fiber 20 may have a diameter of approximately 1 nm.

Referring again to FIG. 3, the method also includes, concurrent with applying the magnetic field 16, contacting the plurality of magnetic fibers 20 with a polymer precursor 30 to thereby individually sheathe each of the plurality of magnetic fibers 20 with the polymer precursor 30. For example, the plurality of magnetic fibers 20 may be contacted with an amount of the polymer precursor 30 sufficient to thereby individually sheathe each of the plurality of magnetic fibers 20 with the polymer precursor 30. That is, the polymer precursor 30 may wrap each magnetic fiber 20 with a thin layer or sheath to thereby coat the adjacent magnetic particles 12 stacked into individual magnetic fibers 20. However, the polymer precursor 30 does not connect adjacent magnetic fibers 20. That is, the polymer precursor 30 does not bridge neighboring magnetic fibers 20, but rather envelops each magnetic fiber 20 individually, as best shown in FIG. 3.

The polymer precursor 30 may contact each magnetic fiber 20 via any process suitable for forming a thin sheath around each magnetic fiber 20. For example, the polymer precursor 30 may be sprayed onto the plurality of magnetic fibers 20 via an atomizer spray gun. Alternatively, the polymer precursor 30 may be dropped onto the magnetic fibers 20 via a dropper. Therefore, the polymer precursor 30 may be in liquid form.

As used herein, the terminology "polymer precursor" refers to a monomer or system of monomers capable of additional polymerization and curing to form a polymer 32 (FIG. 1) or a polymer solution which solidifies after solvent evaporation. That is, the polymer precursor 30 may be a pre-polymer. As such, the polymer precursor 30 may have a lower molecular weight than the polymer 32. Suitable polymer precursors 30 may include epoxy-based precursors, polyurethane-based precursors with or without ionic or mesogenic components, polyimide-based precursors, polyester-based precursors, polyethylene-based precursors, polystyrene-based precursos, and combinations thereof. A specific example of a suitable polymer precursor 30 includes diglycidyl ether of bisphenol A epoxy monomer, commercially available under the trade name EPON™ Resin 826 from Hexion Specialty Chemicals of Houston, Tex., and a multi-amine curing agent.

The method further includes, concurrent with applying the magnetic field 16 and after contacting the plurality of magnetic fibers 20 with the polymer precursor 30, solidifying the polymer precursor 30 to thereby individually sheathe each of the plurality of magnetic fibers 20 with the polymer 32 (FIG. 1) so that each of the plurality of magnetic fibers 20 is not connected by the polymer 32 to any adjacent magnetic fiber 20 to thereby form the microfibrous article 10, as best shown in FIG. 1. For example, in one variation, the method includes, concurrent with applying and after contacting, sufficiently curing the polymer precursor 30 (FIG. 3) so that each of the plurality of magnetic fibers 20 is selectively permanently fixed by a sufficiently thin layer of the polymer 32 and is not connected by the polymer 32 to any adjacent magnetic fiber 20, as shown in FIG. 1. The polymer precursor 30 may be solidified via any suitable process for toughening and hardening the polymer precursor 30 to cross-link the polymer precursor 30 to form polymer chains. That is, solidifying may cure the polymer precursor 30. The polymer precursor 30 may be cured by, for example, heating the polymer precursor 30, adding a cross-linking agent to the polymer precursor 30, exposing the polymer precursor 30 to ultraviolet radiation, and combinations thereof. Further, the polymer precursor 30 may include a solvent and solidifying may include evaporating the solvent.

As shown in FIG. 3 and as set forth above, while the magnetic field 16 is applied, the plurality of magnetic particles 12 assemble adjacent and in contact with one another to thereby form each magnetic fiber 20. Simultaneously curing the polymer precursor 30 forms individual polymer sheaths on each magnetic fiber 20 and provides each magnetic fiber 20 with rigidity and support. That is, curing the polymer precursor 30 to individually sheathe each of the plurality of magnetic fibers 20 with the polymer 32 (FIG. 1) fixes, i.e., solidifies, each magnetic fiber 20 in place aligned substantially parallel to the direction of the magnetic field 16.

Further, as best shown in FIG. 1, each of the plurality of magnetic fibers 20 is not connected by the polymer 32 to any adjacent magnetic fiber 20. That is, the polymer 32 does not bridge and/or interconnect neighboring magnetic fibers 20, but rather individually sheathes each magnetic fiber 20.

Figure 5:
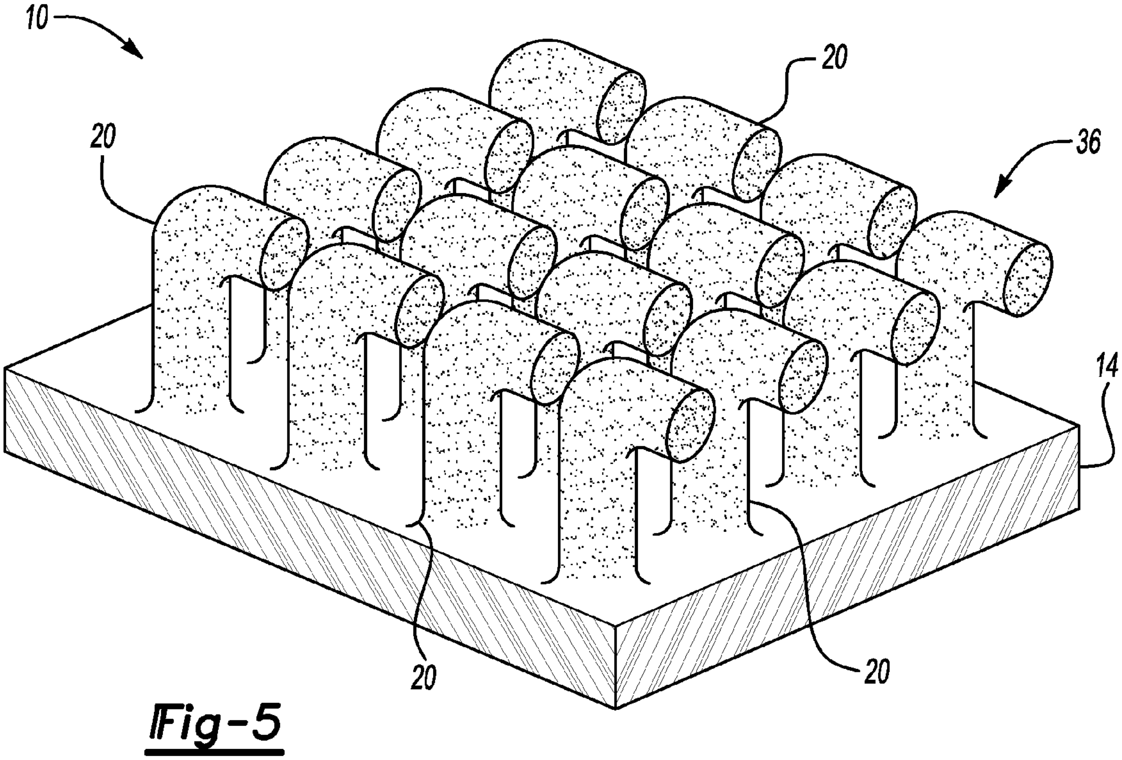
FIG. 5 is a schematic magnified perspective view of the microfibrous article of FIG. 1 wherein the plurality of magnetic fibers is selectively disposed in a second configuration.

The polymer 32 may be selected according to desired properties of the microfibrous article 10 and may be dependent upon the selection of the polymer precursor 30. For example, the polymer 32 may be selected to impart rigidity, strength, and/or shape-change capability to each magnetic fiber 20. By way of a non-limiting example, the polymer 32 may be an epoxy polymer. In another example, the polymer 32 may be a shape-memory polymer changeable between a first configuration 34 (FIG. 1) and a second configuration 36 (FIG. 5). Likewise, in yet another example, the polymer 32 may be a shape-memory polymer changeable between each of at least three configurations 34 (FIG. 1), 36 (FIG. 5), 38 (FIG. 6), i.e., a multi shape-memory polymer. As used herein, the terminology "shape-memory polymer" refers to a composition capable of memorizing a temporary shape and recovering a permanent shape upon external stimulation, e.g., by thermal-, light-, or electro-activation. Further, the shape-memory polymer may transition between configurations 34, 36, 38 or shapes via heating and cooling according to a glass transition or melting temperature of the shape-memory polymer.

The method may further include removing the magnetic field 16 (FIG. 3) from the substrate 14 after curing without changing the alignment of the plurality of magnetic fibers 20. That is, the substrate 14 and formed magnetic fibers 20 may be removed from the magnetic field, e.g., by removing the surrounding magnets 22 from the substrate 14, and the plurality of magnetic fibers 20 may each remain aligned in the direction of the previously-applied magnetic field 16. That is, the alignment of the plurality of magnetic fibers 20 remains unchanged.

Figure 6:
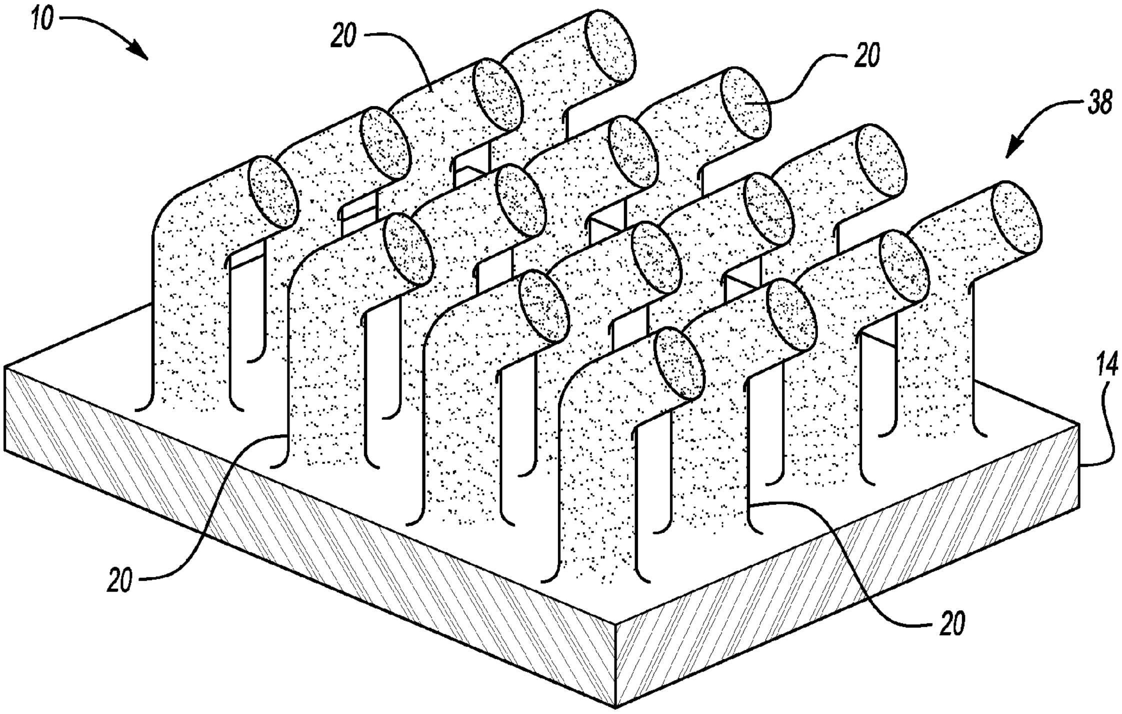
FIG. 6 is a schematic magnified perspective view of the microfibrous article of FIGS. 1 and 5 wherein the plurality of magnetic fibers is selectively disposed in a third configuration.

In another variation, described with reference to FIGS. 1, 5, and 6, the method includes, after curing, changing a shape of at least some of the plurality of magnetic fibers 20 between the first configuration 34 (FIG. 1) and the second configuration 36 (FIG. 5) to thereby form the microfibrous article 10. For example, in this variation, the polymer 32 may be the shape-memory polymer selectively changeable between the first configuration 34 and the second configuration 36 or the multi shape-memory polymer selectively changeable between each of at least three configurations 34 (FIG. 1), 36 (FIG. 5), 38 (FIG. 6).

Changing the shape of at least some of the magnetic fibers 20 may include cooling the microfibrous article 10 under load. For example, changing the shape may include first deforming the magnetic fibers 20 at an elevated temperature and cooling the microfibrous article 10 under load. That is, as one example, for the variation including a shape-memory or multi shape-memory polymer and magnetic fibers 20 disposed substantially perpendicular to the substrate 14 (as shown in FIG. 1), some or all of the magnetic fibers 20 may be compressed towards the substrate 14 by a load so as to deform the plurality of magnetic fibers 20 into the temporary second configuration 36 shown in FIG. 5. While under load, the microfibrous article 10 may be cooled to a temperature lower than a glass transition temperature, $T_g$, of the polymer 32, e.g., about 60° C., to thereby fix the shape of the magnetic fibers 20 into the second configuration 36. Although not shown, it is to be appreciated that two opposing microfibrous articles 10 having the second configuration 36 shown in FIG. 5 may be used as a dry adhesive. That is, the two microfibrous articles 10 may be pressed together so that the plurality of magnetic fibers 20 having the second configuration 36 intertwine, tangle, and/or interlock to thereby adhere one microfibrous article 10 to the other 10.

In this variation, changing the shape of the plurality of magnetic fibers 20 may further include heating the microfibrous article 10. For example, the microfibrous article 10 may be heated to above the glass transition temperature, $T_g$, of the polymer 32, e.g., about 70° C., so that the plurality of magnetic fibers 20 may revert to the first configuration 34 shown in FIG. 1. That is, the selectively permanent first configuration 34 of the magnetic fibers 20 may be recovered. Consequently, in the aforementioned example of two opposing, interlocked microfibrous articles 10, heating may change the shape of the magnetic fibers 20 to the first configuration 34 so that the microfibrous articles 10 may be separated from one another, i.e., the magnetic fibers 20 may untangle and become separable.

Similarly, in a variation including the multi shape-memory polymer and magnetic fibers 20 disposed substantially perpendicular to the substrate 14 (as shown in FIG. 1), the magnetic fibers 20 may be compressed towards the substrate 14 by a load so as to deform the plurality of magnetic fibers 20 into the temporary second configuration 36 shown in FIG. 5. That is, while under load, the microfibrous article 10 may be cooled to a temperature lower than the glass transition temperature, $T_g$, of the polymer 32, e.g., about 60° C., to thereby fix the shape of the magnetic fibers 20 into the second configuration 36. Further, the microfibrous article 10 may be deformed again under tension and cooled to a temperature of, for example, about 20° C. to thereby fix the shape of the magnetic fibers 20 into the third configuration 38 shown in FIG. 6. Upon reheating the microfibrous article 10 to about 60° C., for example, the second configuration 36 (FIG. 5) of the magnetic fibers 20 may be recovered. In addition, upon reheating the microfibrous article 10 to above, for example, about 80° C., the permanent first configuration 34 (FIG. 1) may be recovered. Therefore, the method may be useful for applications requiring relatively weak adhesion between two microfibrous articles 10. That is, the temperature of two adhered microfibrous articles 10 may be changed during operation to effect partial or complete untangling of the magnetic fibers 20 and separation of the microfibrous articles 10. The method also economically forms the microfibrous article 10, and is sufficiently flexible to accommodate desired characteristics of the microfibrous article 10. For example, the microfibrous article 10 may be tailored to include magnetic fibers 20 aligned substantially parallel to any predetermined direction.

Referring again to FIG. 1, the resulting microfibrous article 10 includes the substrate 14 and the plurality of magnetic fibers 20 disposed on the substrate 14. Each of the plurality of magnetic fibers 20 is individually sheathed with the polymer 32 and includes the plurality of magnetic particles 12 (FIGS. 2-4). In particular, each of the plurality of magnetic particles 12 may be assembled adjacent and in contact with one another to thereby form each of the plurality of magnetic fibers 20. That is, the plurality of magnetic particles 12 may adjoin one another and be stacked along the length 26 (FIG. 3) of the magnetic fiber 20, as set forth above.

Further, each of the magnetic fibers 20 is aligned substantially parallel to the magnetic field 16 (FIGS. 3 and 4) and not connected by the polymer 32 (FIG. 1) to any adjacent magnetic fiber 20. For example, each of the plurality of magnetic fibers 20 may be permanently aligned along the magnetic field 16. That is, the alignment of the magnetic fibers 20 does not change after the microfibrous article 10 is removed from the magnetic field 16. However, although the alignment of the magnetic fibers 20 does not change, the shape or configuration of the magnetic fibers 20 may selectively change, e.g., between the first configuration 34 (FIG. 1) and the second configuration 36 (FIG. 5), as set forth in detail above. That is, each of the plurality of magnetic fibers 20 may be selectively permanently fixed by the sufficiently thin layer of the polymer 32 as set forth above, but may selectively change shape between configurations 34, 36, 38. Therefore, the microfibrous article 10 exhibits excellent controllable adhesion to and releaseability from other surfaces.

While the best modes for carrying out the disclosure have been described in detail, those familiar with the art to which this disclosure relates will recognize various alternative designs and embodiments for practicing the disclosure within the scope of the appended claims.

The invention claimed is:

1. A microfibrous article comprising:
a substrate; and
a plurality of magnetic fibers disposed on said substrate;
wherein each of said plurality of magnetic fibers is individually sheathed with a polymer and includes a plurality of magnetic particles;
wherein said plurality of magnetic particles is assembled adjacent and in contact with one another;
wherein each of said plurality of magnetic fibers is aligned along a magnetic field and not connected by said polymer to any adjacent magnetic fiber.

2. The microfibrous article of claim 1, wherein each of said plurality of magnetic fibers is disposed substantially perpendicular to said substrate.

3. The microfibrous article of claim 1, wherein the substrate and each of said plurality of magnetic fibers define an acute angle therebetween.

4. The microfibrous article of claim 1, wherein said polymer is an epoxy polymer.

5. A microfibrous article comprising:
a substrate; and
a plurality of magnetic fibers disposed on said substrate;
wherein each of said plurality of magnetic fibers is individually sheathed with a polymer and includes a plurality of magnetic particles;
wherein said polymer is a shape-memory polymer changeable between a first configuration and a second configuration;
wherein each of said plurality of magnetic fibers is aligned along a magnetic field and not connected by said polymer to any adjacent magnetic fiber.

6. A microfibrous article comprising:
a substrate; and
a plurality of magnetic fibers disposed on said substrate;
wherein each of said plurality of magnetic fibers is individually sheathed with a polymer and includes a plurality of magnetic particles;
wherein said polymer is a shape-memory polymer changeable between each of at least three configurations;
wherein each of said plurality of magnetic fibers is aligned along a magnetic field and not connected by said polymer to any adjacent magnetic fiber.

7. The microfibrous article of claim 1, wherein each of said plurality of magnetic fibers is permanently aligned along the magnetic field.

8. The microfibrous article of claim 1, wherein said each of said plurality of magnetic particles has an average particle size of from about 1 μm to about 200 μm.

9. The microfibrous article of claim 1, wherein said substrate includes plastic.

10. The microfibrous article of claim 5, wherein the substrate and each of said plurality of magnetic fibers define an acute angle therebetween.

* * * * *